United States Patent [19]

Tsai

[11] Patent Number: 4,838,367
[45] Date of Patent: Jun. 13, 1989

[54] PRICE INDICATING MEANS FOR A WEIGHING SCALE

[76] Inventor: Tai A. Tsai, No. 2, Hsing Ai Road, Tainan, Taiwan

[21] Appl. No.: 235,942

[22] Filed: Aug. 23, 1988

Related U.S. Application Data

[63] Continuation-in-part of Ser. No. 154,789, Feb. 10, 1988.

[51] Int. Cl.$^4$ .................. G01G 23/22; G01G 3/14; G01G 3/00
[52] U.S. Cl. ........................ 177/25.15; 177/210 C; 177/225
[58] Field of Search ......... 177/1, 210 C, 225, DIG. 6, 177/25.15

[56] References Cited

U.S. PATENT DOCUMENTS

| | | | |
|---|---|---|---|
| 3,786,880 | 1/1974 | Artwick | 177/243 X |
| 4,129,191 | 12/1978 | Kanning | 177/DIG. 6 |
| 4,366,876 | 1/1983 | Chen | 177/210 C |
| 4,381,040 | 4/1983 | Brouwer | 177/210 C |

Primary Examiner—George H. Miller, Jr.

[57] ABSTRACT

A price indicating apparatus for a spring-loaded weighing scale used for calculating the total price and displaying the price of an article, comprising an inducing component and a transducing component. The inducing component is mounted on the rack of the weighing scale to be shifted according to the movement of the tray; the transducing component is provided for sensing the amount of movement of the inducing component and converting it into digital signals and calculating the price by multiplying the weight and the unit price input from a keyboard.

10 Claims, 8 Drawing Sheets

PRICE INDICATING MEANS FOR A WEIGHING SCALE

This application is the continuation-in-part of a U.S. patent application, Ser. No. 154,789, filed Feb. 10, 1988.

BACKGROUND OF THE INVENTION

This invention relates to a price indicating means for a weighing scale, especially for a spring-loaded weighing scale, comprising an inducing component and a transducing component. The inducing component is mounted on a rack of a spring-loaded weighing scale so that it can move vertically with the rack; the transducing component is provided for sensing the amount of movement of the inducing component and converting it into digital signals and calculating the price by multiplying the weight and the price per unit input from a keyboard.

Heretofore, a conventional electrical weighing scale weighs an article by sensing the gravitation force produced by the weighed article and converting the amount of the force to serial electrical signals. The unit price is set from a keyboard. After processing the serial electrical signals and the set unit price in a processor, the product multiplied thereof then is displayed.

As is common in a price indicating means of an electrical weighing scale, a price indicating means employed in this invention which operates electrically is provided on a spring-loaded weighing scale for calculating and displaying the price of a weighed article by multiplying the weight measured by the weighing scale and the unit price input from a keyboard. Therefore, the spring-loaded weighing scale of this invention has electrical calculating and displaying functions like common electrical weighing scales.

When in use, the conventional electrical weighing scale is easily damaged by dropping or by an excessive force thereon. This is due to the use of a load cell which utilizes a sensor with high sensitivity to unexpected force.

Therefore, to avoid damage due to the rigidity of structure, the price indicating means of this invention is provided on a spring-loaded weighing scale which utilizes an electrical sensing technique to make the spring-loaded weighing scale have an electrically calculating and displaying function.

SUMMARY OF THE INVENTION

An important aspect of the present invention is that the electrical price indicating means comprises an inducing component and a transducing component which are mounted on the spring-loaded weighing scale and sense the weight of an article by measuring the capacitance change between the inducing component and the transducing component resulting from the vertical displacement of the inducing component mounted on a rack of the spring-loaded weighing scale.

This invention will become more apparent from a careful reading of the detailed description provided hereinafter, with appropriate reference to the attached drawings, showing a preferred embodiment of the present invention.

DETAILED DESCRIPTION OF THE PREFERRED EMBODIMENT

Figure 1:
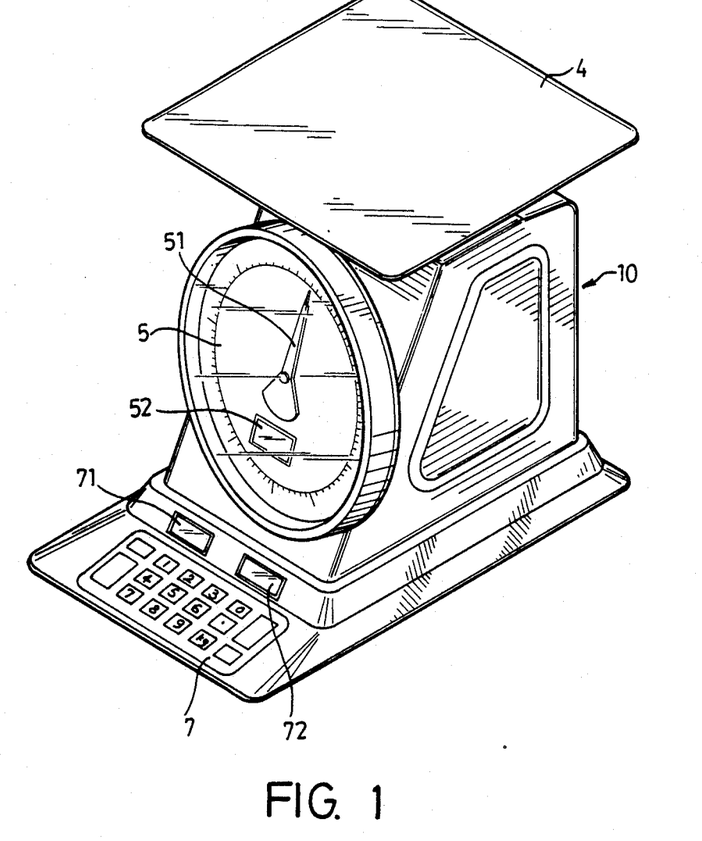
FIG. 1 shows a perspective view of a spring-loaded weighing scale comprising a price indicating means in accordance with this invention.

With reference to the drawings and in particular to FIG. 1 thereof, it can be seen that an electrical price indicating means is mounted to the bottom of a spring-loaded weighing scale 10 in accordance with the present invention. A pointer 51 is pivotedly mounted on the center point of a dial face 5 of the weighing scale 10 to indicate the weight of an article and an LCD (Liquid Crystal Display) 52 is also mounted thereon to display the weight in numeral.

Figure 2:
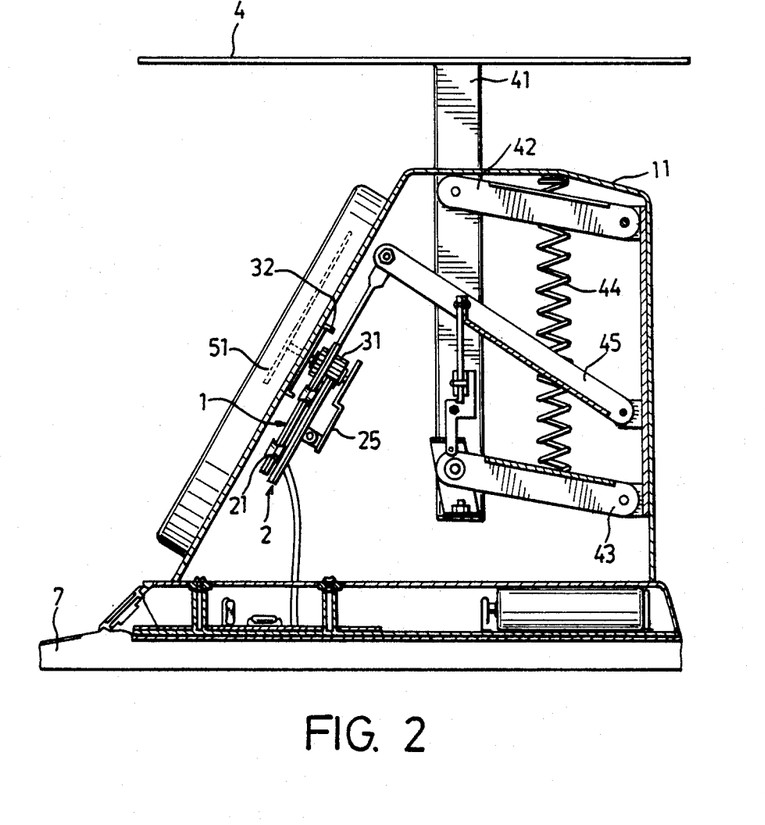
FIG. 2 shows a side sectional view of the spring-loaded weighing scale of FIG. 1.

As is common in a conventional spring-loaded weighing scale, the spring-loaded weighing scale 10 comprises a tray 4 which is supported by an U-shaped supporting frame 41 (only its lateral side shown), as shown in FIG. 2. Rods 42, 43 are respectively pivotedly connected to a lateral side of the supporting frame 41 on one distal end of each rod 42, 43 and to the housing 11 of the weighing scale 10 on the other distal end thereof. Moreover, a spring element 44 is secured between the upper surface of the housing 11 and the rod 43 to operate as a function of the load on the tray 4.

A pivot arm 45 is pivotedly fixed on the supporting frame 41 substantially with the central portion of the arm 45 and further is pivotedly connected to a rack 3 and the housing 11 with respective distal ends of the arm 45. A gear 31 is engaged to and driven by the rack 3, which is connected to the pointer 51 passing through a fixing plate 32. Therefore, when measuring the weight of an article, the supporting frame 41 below the tray 4 is pressed to drive the rack 3 to shift. This results in the gear 31 being rotated and driving the pointer 51 to indicate the weight on the dial face 5.

Figure 3:
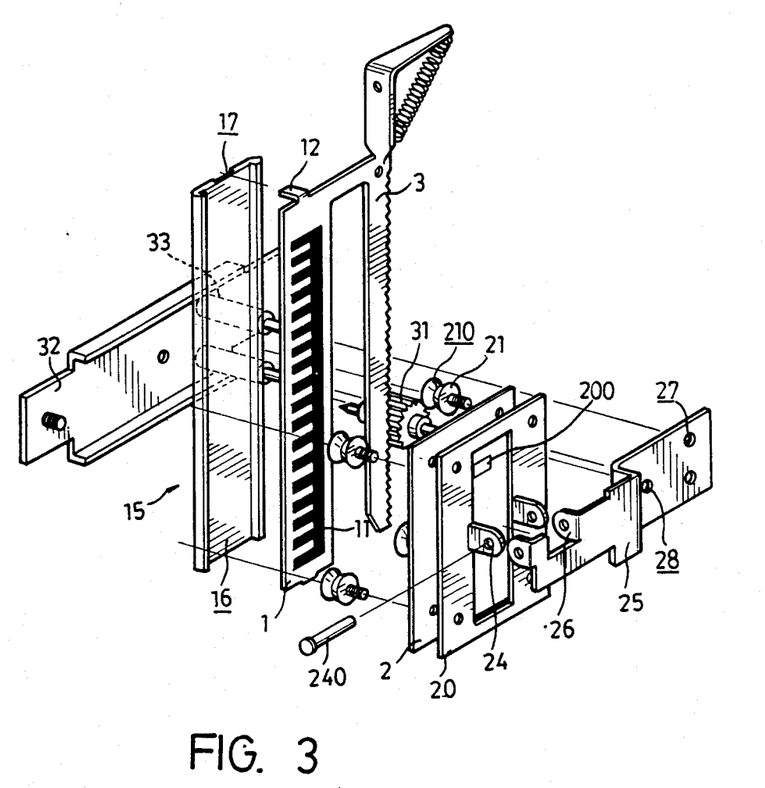
FIG. 3 is an exploded view of the price indicating means in accordance with this invention shown along with a rack of the spring-loaded weighing scale.

Particularly referring to FIG. 3, the outstanding feature of this invention is that the electrical price indicating means of this invention is principally composed of an inducing component 1 and a transducing component 2 which are printed circuit boards. The inducing component 1 which has an etched pattern of inducing strip 11 is mounted on the rack 3 to be shifted according to the movement of the rack 3. The inducing strip 11 has an elongate body with a plurality of horizontal sections laterally protruded therefrom to be induced by the transducing component 2 when shifted. A guide plate 15 has a groove 16 along its length to receive the inducing component 1 so as to prevent the inducing component 1 from deformation. The inducing component 1 is secured on the guide plate 15 by tabs 12 which are provided on the upper and lower ends of the inducing component 1 being lodged in respective recesses 17 formed on the rear side of the guide plate 15.

The transducing component 2 is installed on a sloted plate 20 by means of four rollers 21 secured by screws on four corners of the sloted plate 20 and the transducing component 2. Please note that the sloted plate 20 is pivoted to a retaining plate 25 by a pin 240 penetrating two pairs of trunions 24, 26 respectively provided on the sloted plate 20 and the retaining plate 25. The retaining plate 25 is fixed on the fixing plate 32 by two posts 33 (shown in dotted lines in FIG. 3) positioned and fixed between the fixing plate 32 and the retaining plate 25 through holes 27 on the retaining plate 25. Moreover, the gear 31 is fixed in an opening 28 of the retaining plate 25 with its distal end.

Figure 4:
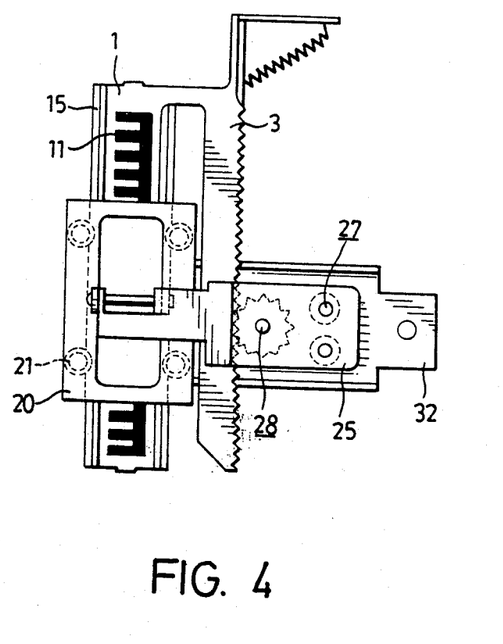
FIG. 4 is a perspective view of the price indicating means and spring-loaded weighing scale, wherein the rollers are indicated in dotted lines.

The electrical price indicating means is shown in FIG. 4. The inducing component 1 enclosed by the guide plate 15 is slidable between the four rollers 21 mounted on the transducing component 2, wherein a notch 210 is provided on each roller 21 to permit the guide plate 15 to slide thereon. This results in the distance between the inducing component 1 and the transducing component 2 to remain constant. Therefore, the change of capacitance created between the inducing component 1 and transducing component 2 is based on the effectively opposing area therebetween.

Figure 5:
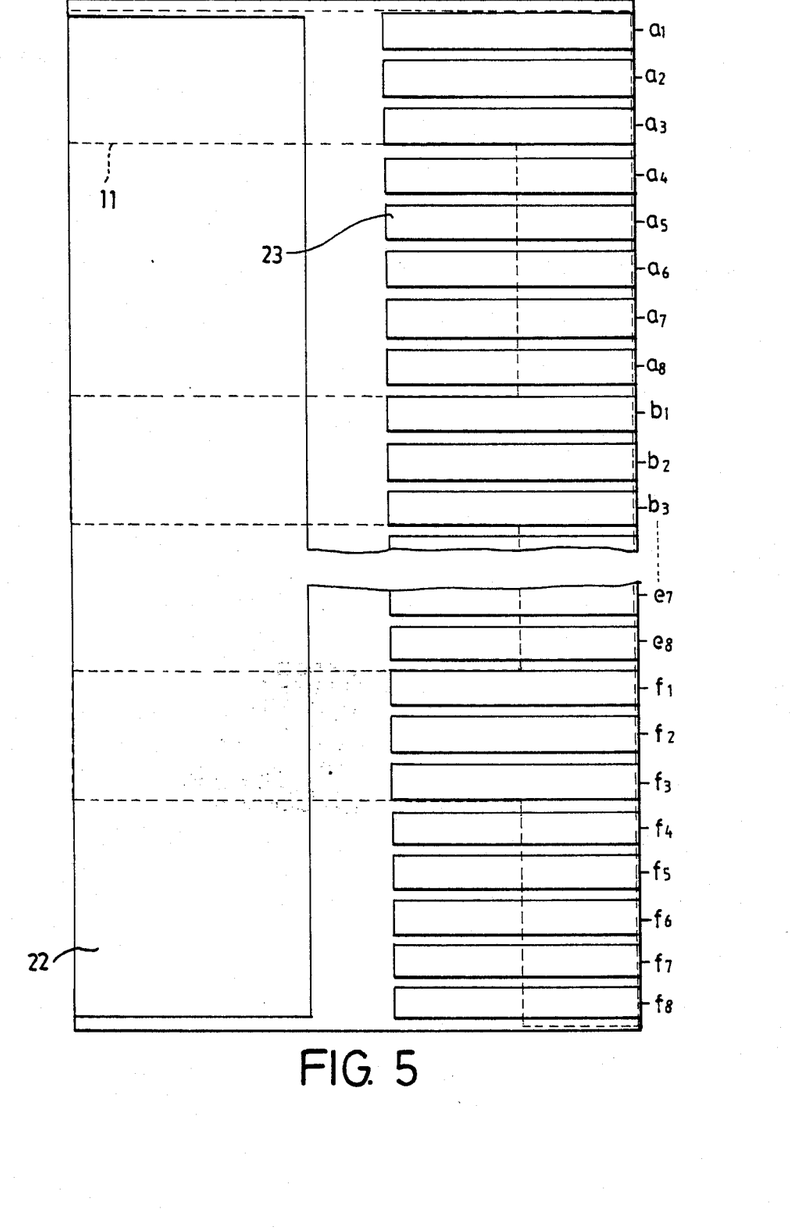
FIG. 5 is a front view of the transducing component, wherein a sensing electrode and an excitation electrode are provided and the excitation electrode is composed of a plurality of conductors.

Although not limited thereto, the transducing component 2 preferably has an etched pattern of inducing elements, here a sensing electrode 22 and an excitation electrode 23 respectively provided on two sides of the surface opposite to the inducing component 1, shown in FIG. 5, wherein the inducing strip 11 is indicated in dotted lines. Further, the transducing component 2 has a sensor integrated circuit 200 provided on the other surface thereof, shown in FIG. 3. The sensing electrode 22 and the excitation electrode 23 impulsed by the sensor integrated component 200 act as two electrodes of a capacitor when the transducing component 2 faces to and is induced by the inducing component 1.

The excitation electrode 23 has a plurality, here forty eight, of conductors which are insulated from one another and divided into six groups; i.e. G1, G2, . . . and G6, wherein G1 is composed of conductors a1, a2, . . . a8; G2 is composed of conductors b1, b2, . . . b8; . . . G5 is composed of e1,e2, . . . e8 and G6 is composed of f1, f2, . . . f8 according to the sequence of the conductors. Take the first conductor in each group, namely a1, b1, . . . i1 and f1, shorted together not only to increase the amount of the capacitance but also to simplify the detecting process which will be detailed hereinafter.

The process for sensing the shift of the inducing component 1 is to detect the change of the capacitance induced in each conductor. In a perferable embodiment according to this invention, the sensor integrated circuit 200 instantaneously impulses a set of four adjacent conductors to be shorted and to act as one electrode of a capacitor; meanswhile, the sensing electrode 22 acts as the other electrode. Subsequently, the sensor integrated circuit 200 impulses another set of four adjacent conductors.

Figure 6:
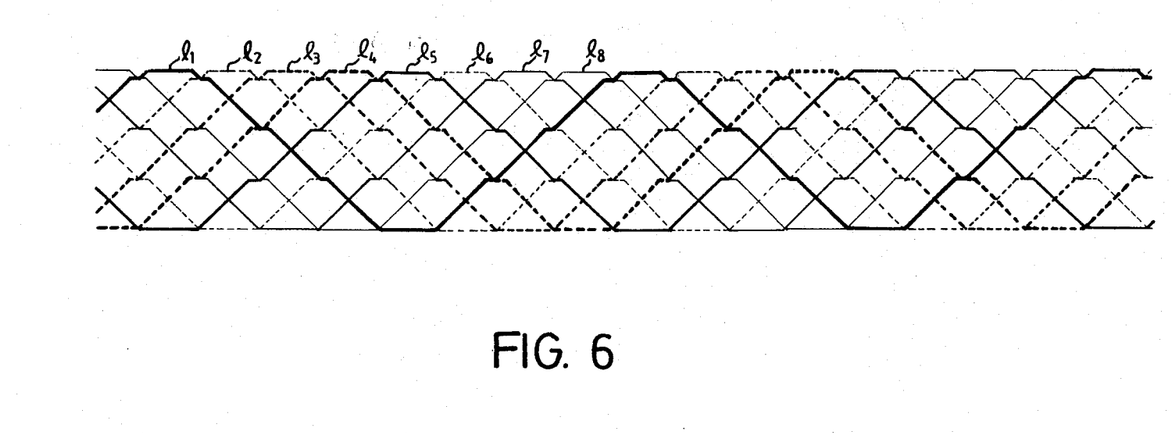
FIG. 6 shows the phasor relationship between the waveforms of groups of conductors.

It should be noted that only eight such sets of four adjacent conductors should be impulsed to measure the voltage created by the capacitance induced thereon since conductors a1, b1, . . . and f1 are shorted and other conductors are shorted in a like manner. Momentarily referring to FIG. 6, it can be seen that the waveforms are composed by said eight sets of four adjacent conductors, wherein waveform L1 for conductors a1, a2, a3, a4; L2 for a2, a3, a4, a5; L3 for a3, a4, a5, a6; L4 for a4, a5, a6, a7; L5 for a5, a6, a7, a8; L6 for a6, a7, a8, a1; L7 for a7, a8, a1, a2 and L8 for a8, a1, a2, a3.

In each waveform, the ordinate represents the capacitance on the respective set of conductors and the abscissa represents the relative displacement between the inducing component 1 and the transducing component 2 in connection with respective sets of the conductors. It is appreciated that the phase difference between two adjacent sets of the conductors are wavelength/8 and the steps in each waveform is caused by the discontinuity among the conductors. Moreover, the flat portion on the peak of each waveform is equal to the width of each conductor since the width of the lateral sections of the inducing strip 11 is equal to the width of three conductors aligned together shown in FIG. 5. Particularly referring to FIG. 7, it can be seen that a waveform 100 which is composed of a series of pulses of various voltages approximately from $-100$ mV to 100 mV and substantially have a sine wave envelope is created by the sensor integrated circuit 200 and a switching logic circuit 89 shown in FIG. 8 exciting different sets of four adjacent conductors; the sequence of the eight sets of the conductors to be excited being predetermined and remained constant.

Figure 7:
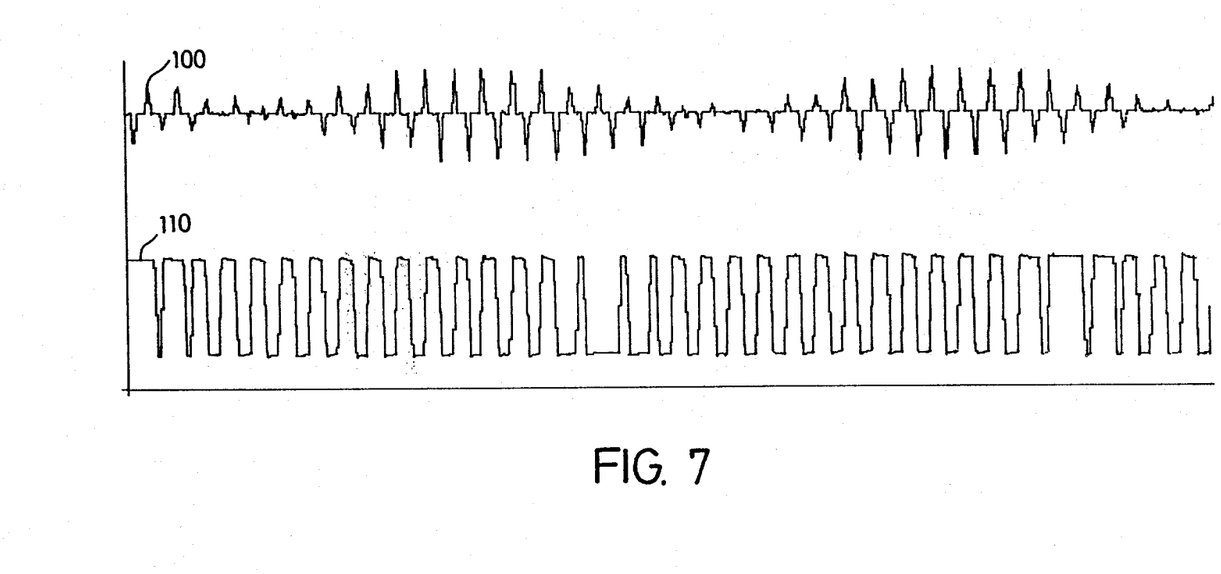
FIG. 7 shows a diagram representation of the voltages, as in waveform 100, on sets of the four adjacent conductors wherein each conductor is excited by a series of similar pulses 110 created from the sensor integrated circuit.

Moreover, the waveform 110 is composed of a series of pulses of the same voltage as the power supply Vcc for the sensor integrated circuit 200, which is provided by excitation logic 88 within the sensor integrated circuit 200. Only one of the waveform 110 is displayed for description and there are eight different waveforms similar to the waveform 110 according to this invention. Obviously, there are four conductors excited at the same time as previous description so as to create the waveform 100.

Figure 8:
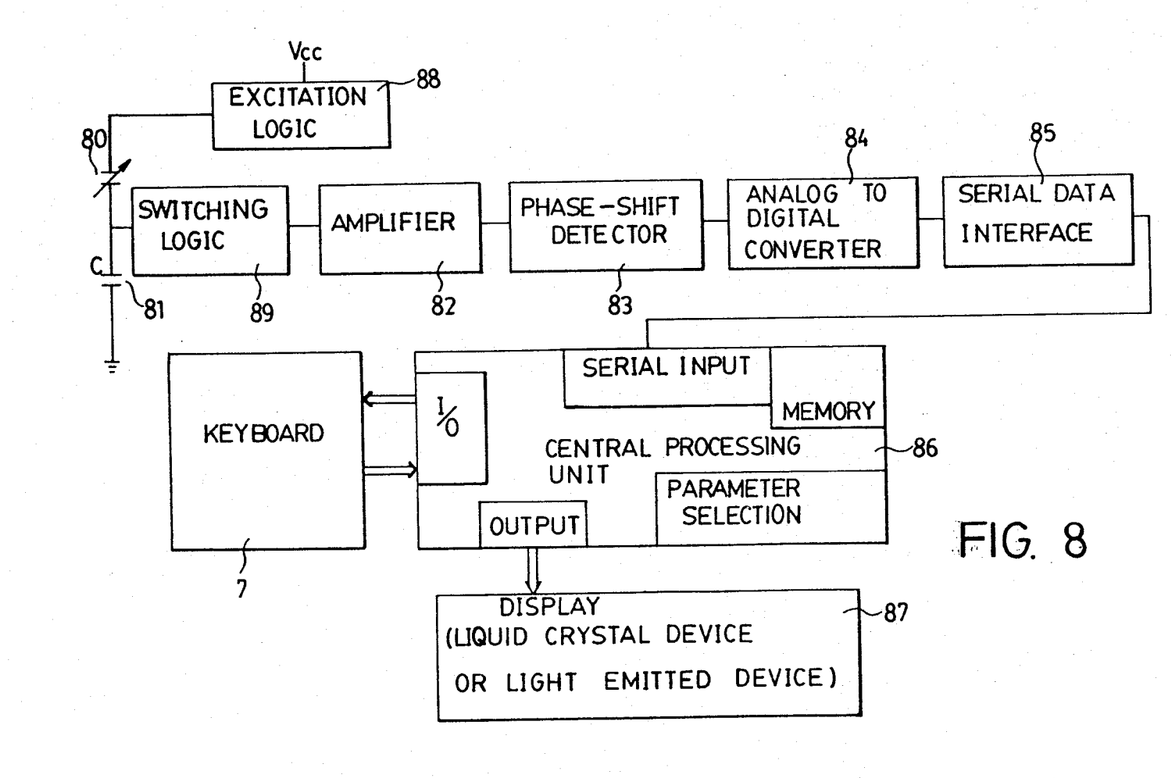
FIG. 8 is a block diagram of a preferred embodiment of the price indicating means in accordance with the invention.

As can be seen in FIG. 8, the transducing component 2 and the inducing component 1 cooperatively act as a variable capacitor and are connected to an amplifier 82 coupled by a balance capacitor 81. It should be noted that while the inducing component 1 has relative movement with the transducing component 2, the waveform 100 would have a phase shift because of the different sets of conductors corresponding to respective waveforms with phase differences shown in FIG. 6. Furthermore, the phase shift is proportional to the displacement therebetween.

A phase-shift detector 83 detects the phase shift and the results are undergone by a known technique. For example, the results (phase shift) are converted into a digital signal by an analog to digital converter 84 and then the digital signal is transformed into serial data and fed to a central processing unit 86 through a serial transmission 85 for further processing.

The serial data is converted to the weight of the article by the central processing unit 86 and displayed on LCD 52 shown in FIG. 1 and multiplied with the unit price of the weighed article input from a keyboard 7 and the multiplication therefrom is displayed on the displaying means. Although not limited thereof, the unit price of the weighed article is shown by an LCD 71 and the total price is shown in another LCD 72 provided on the keyboard 7.

Especially note that the pivot connection between the sloted plate 20 and the retaining plate 25 by the pin 240 permits the regular operation between the inducing component 1 and transducing component 2 since such a connection compensates for the substantially arced movement of the inducing component 1. This results from the levering movement of the pivot arm 45 since it is respectively pivoted on the supporting frame 41 and the housing 11.

Accordingly, it is seen that the price indicating means is an auxiliary means of a spring-loaded weighing scale which calculates the price of a weighed article by the change of capacitance resulting from the movement of the inducing component 1 so as to provide the common spring-loaded weighing scale with an electrical price indicating function.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A price indicating means for a weighing scale which has a dial face, a tray supported by a supporting frame, a pair of spring elements, a pivot arm respectively pivoted on said supporting frame, a housing of said weighing scale and a rack to drive said rack according to a movement of said tray, a gear engaged to said rack and connected to a pointer to drive said pointer to indicate a scale on said dial face, comprising:
   (a) an inducing component having an etched pattern of an inducing strip, being mounted on said rack to be shifted according to the movement of said rack;
   (b) a guide plate receiving said inducing component by tabs provided on upper and lower portions of said inducing component lodged in respectively recesses formed on the rear side thereon to prevent said inducing component from deformation;
   (c) a transducing component having another etched pattern thereon opposite to said inducing component for sensing the amount of movement of said inducing component;
   (d) a sloted plate on which said transducing component is mounted and secured by a plurality of rollers, each roller having a notch for said guide plate slidable therebetween;
   (e) a retaining plate on which said sloted plate is mounted fixed on said housing by posts provided therebetween; and
   (f) a keyboard to enter an unit price of an article to be weighed and be provided with display means.

2. A price indicating means as set forth in claim 1, wherein said sloted plate is pivoted to said retaining plate by a pin penetrating two pairs of trunions respectively provided on said sloted and said retaining plates.

3. A price indicating means as set forth in claim 1, wherein said inducing strip has an elongate body with a plurality of horizontal sections laterally protruded therefrom to be induced by said transducing component.

4. A price indicating means as set forth in claim 1, wherein said transducing component has a sensing electrode and an excitation electrode respectively provided thereon opposite to said inducing component.

5. A price indicating means as set forth in claim 4, wherein said excitation electrode has a plurality of conductors which are insulated from one another.

6. A price indicating means as set forth in claim 5, wherein said conductors are divided into a plurality of groups in each one of which one conductor is shorted together with another conductor in another group.

7. A method for operating a price indicating means in a spring-loaded weighing scale is that said price indicating means has an inducing component and a transducing component; a change of capacitance created between the inducing component and the transducing component is based on the relative movement therebetween and is converted into a phase shift by a sensor integrated circuit.

8. A method as set forth in claim 7, wherein the inducing component has an inducing strip which has an elongate body with a plurality of horizontal sections laterally protruded therefrom to be induced by the transducing component.

9. A method as set forth in claim 7, wherein the transducing component has a sensing electrode and an excitation electrode; the excitation electrode has a plurality of conductors which are divided into a plurality of groups, in each one of which one conductor is shorted together with another conductor in another group.

10. A method as set forth in claims 7 or 9, wherein different sets of four adjacent conductors are excited in turn by the sensor integrated circuit to act as one electrode of a capacitor; the sensing electrode excited by the sensor integrated circuit acts as the other electrode of the capacitor.

* * * * *